(12) United States Patent
Clements et al.

(10) Patent No.: US 12,221,898 B2
(45) Date of Patent: Feb. 11, 2025

(54) TURBINE INCORPORATING SPLITTERS

(71) Applicants:General Electric Company, Schenectady, NY (US); GE Avio S.r.l., Rivalta di Torino (IT)

(72) Inventors: Jeffrey Donald Clements, Mason, OH (US); Paul Hadley Vitt, Liberty Township, OH (US); Francesco Bertini, Turin (IT); Aspi Rustom Wadia, Loveland, OH (US); Ganesh Seshadri, Bangalore (IN); Mahendran Manoharan, Bangalore (IN); Ravikanth Avancha, Bangalore (IN)

(73) Assignees: General Electric Company, Evendale, OH (US); GE Avio S.r.l., Rivalta di Torino (IT)

( * ) Notice: Subject to any disclaimer, the term of this patent is extended or adjusted under 35 U.S.C. 154(b) by 1076 days.

(21) Appl. No.: 16/490,416

(22) PCT Filed: Mar. 6, 2018

(86) PCT No.: PCT/EP2018/055480
§ 371 (c)(1),
(2) Date: Aug. 30, 2019

(87) PCT Pub. No.: WO2018/162485
PCT Pub. Date: Sep. 13, 2018

(65) Prior Publication Data
US 2020/0049014 A1    Feb. 13, 2020

(30) Foreign Application Priority Data

Mar. 9, 2017 (EP) ..................................... 17425027

(51) Int. Cl.
*F01D 5/14* (2006.01)
*F01D 5/28* (2006.01)
(Continued)

(52) U.S. Cl.
CPC ............. *F01D 5/145* (2013.01); *F01D 5/284* (2013.01); *F01D 9/041* (2013.01); *F04D 29/324* (2013.01);
(Continued)

(58) Field of Classification Search
CPC . F01D 5/14; F01D 5/145; F01D 5/147; F01D 9/041; F01D 9/06; F05D 2240/12
See application file for complete search history.

(56) References Cited

U.S. PATENT DOCUMENTS 3,039,736 A    6/1962  Pon
3,193,185 A *  7/1965  Erwin ..................... F01D 5/145
                                                        415/193
(Continued)

FOREIGN PATENT DOCUMENTS

CH        308991       8/1955
CN    102052095 A      5/2011
(Continued)

OTHER PUBLICATIONS

International Search Report issued in connection with corresponding International Patent Application No. PCT/EP2018/055480 on Apr. 11, 2018.

*Primary Examiner* — David E Sosnowski
*Assistant Examiner* — Maxime M Adjagbe
(74) *Attorney, Agent, or Firm* — Dority & Manning, P.A.

(57) ABSTRACT

A turbomachinery apparatus (10) includes: a turbine (22), including: a turbine component (36) defining at least one arcuate flowpath surface (40); an array of axial-flow turbine airfoils (46) extending from the flowpath surface, the turbine airfoils defining spaces therebetween; and a plurality of splitter airfoils (146) extending from the at least one flowpath surface, in the spaces between the turbine airfoils, each splitter airfoil having opposed pressure and suction sides (Continued)

extending between a leading edge and a trailing edge, wherein the splitter airfoils have a thickness ratio which is less than a thickness ratio of the turbine airfoils.

6 Claims, 3 Drawing Sheets

(51) Int. Cl.
  *F01D 9/04* (2006.01)
  *F04D 29/32* (2006.01)
(52) U.S. Cl.
  CPC .. *F05D 2240/12* (2013.01); *F05D 2300/6033* (2013.01)

(56) References Cited

U.S. PATENT DOCUMENTS

| | | | |
|---|---|---|---|
| 3,692,425 A | 9/1972 | Erwin | |
| 4,023,350 A | 5/1977 | Hovan et al. | |
| 5,152,661 A | 10/1992 | Sheets | |
| 5,554,000 A | 9/1996 | Katoh et al. | |
| 7,094,027 B2* | 8/2006 | Turner | F01D 5/141 415/194 |
| 8,303,258 B2 | 11/2012 | Aubin | |
| 8,845,286 B2* | 9/2014 | Ramachandran | F01D 5/145 415/199.5 |
| 8,920,127 B2* | 12/2014 | McCaffrey | F01D 5/3084 416/219 R |
| 2005/0147497 A1 | 7/2005 | Doerffer et al. | |
| 2011/0171018 A1 | 7/2011 | Garcia-Crespo | |
| 2013/0051996 A1 | 2/2013 | Hoeger et al. | |
| 2014/0169977 A1 | 6/2014 | Brettschneider et al. | |
| 2015/0052751 A1* | 2/2015 | Hu | B23K 26/389 29/889.721 |
| 2016/0108734 A1 | 4/2016 | Wunderer et al. | |
| 2016/0186772 A1* | 6/2016 | DiPietro, Jr. | F04D 29/681 416/203 |
| 2017/0022835 A1* | 1/2017 | Clark | F01D 9/041 |

FOREIGN PATENT DOCUMENTS

| | | |
|---|---|---|
| CN | 102251811 A | 11/2011 |
| DE | 1937395 U | 4/1966 |
| DE | 2135286 | 1/1973 |
| EP | 0978632 | 2/2000 |
| EP | 2549061 | 7/2012 |
| EP | 3040512 | 12/2015 |
| EP | 3121383 | 5/2016 |
| JP | H-04287802 | 10/1992 |

* cited by examiner

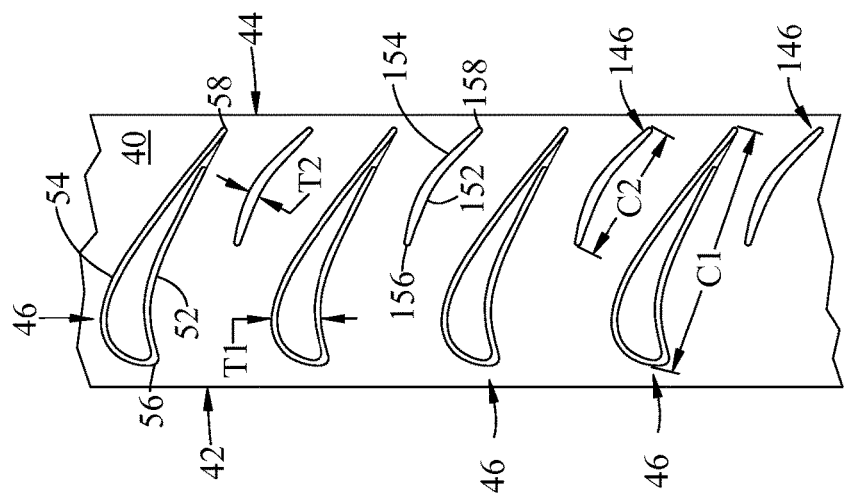
FIG. 3
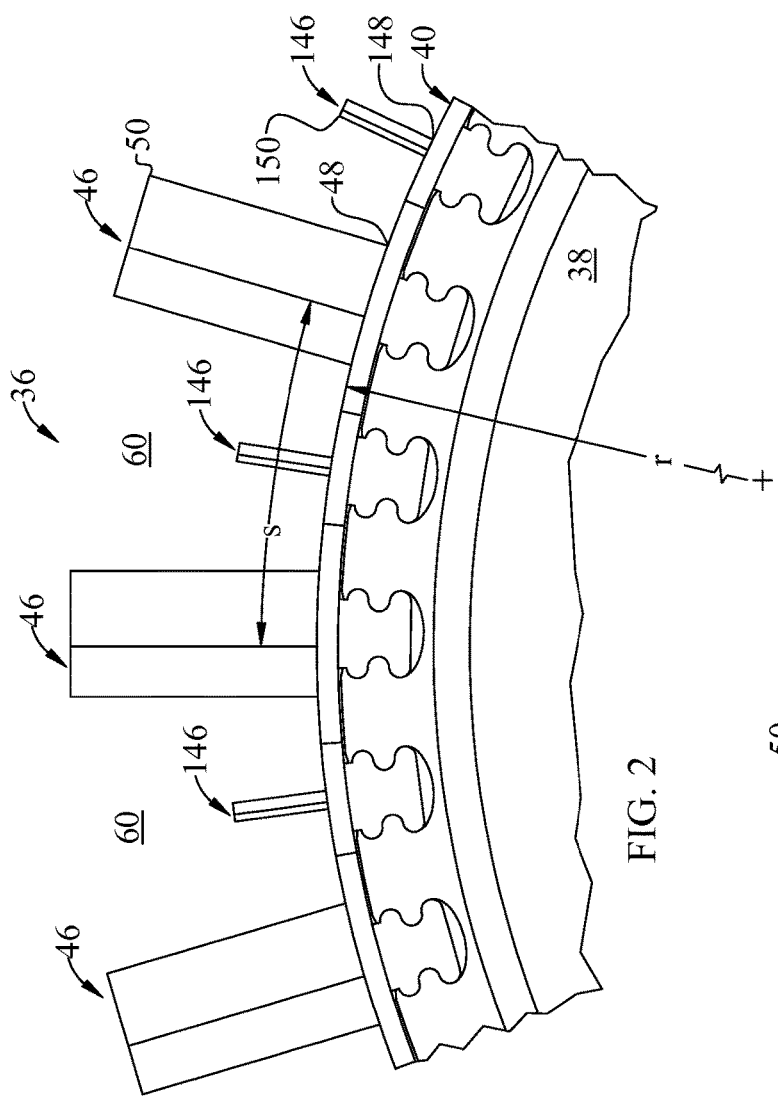
FIG. 2
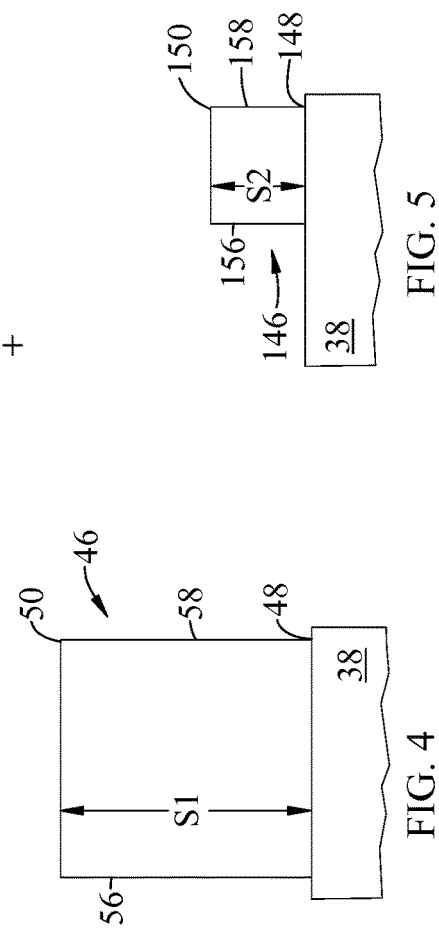
FIG. 5
FIG. 4

TURBINE INCORPORATING SPLITTERS

BACKGROUND

This invention relates generally to turbines in gas turbine engines, and more particularly relates to rotor and stator airfoils of such turbines.

A gas turbine engine includes, in serial flow communication, a compressor, a combustor, and turbine. The turbine is mechanically coupled to the compressor and the three components define a turbomachinery core. The core is operable in a known manner to generate a flow of hot, pressurized combustion gases to operate the engine as well as perform useful work such as providing propulsive thrust or mechanical work. One common type of turbine is an axial-flow turbine with one or more stages each including a rotating disk with a row of axial-flow airfoils, referred to as turbine blades. Typically, this type of turbine also includes stationary airfoils alternating with the rotating airfoils, referred to as turbine vanes. The turbine vanes are typically bounded at their inner and outer ends by arcuate endwall structures.

It is desired to reduce weight, improve rotor performance, and simplify manufacturing by minimizing the total number of turbine airfoils used in a given blade or vane row, thereby reducing a parameter called "solidity". One problem with reduced airfoil solidity is that it can cause increased secondary flows around the airfoils, leading to aerodynamic performance penalties.

BRIEF DESCRIPTION

This problem is addressed by a turbine which incorporates splitters in a blade and/or vane row thereof, to locally increase solidity in regions of high secondary flow.

According to one aspect of the technology described herein, a turbomachinery apparatus includes: a turbine, comprising: a turbine component defining an arcuate flowpath surface; an array of axial-flow turbine airfoils extending from the flowpath surface, the turbine airfoils defining spaces therebetween; and a plurality of splitter airfoils extending from the flowpath surface, in the spaces between the turbine airfoils, each splitter airfoil having opposed pressure and suction sides extending between a leading edge and a trailing edge, wherein the splitter airfoils have a thickness ratio less than a thickness ratio of the turbine airfoils.

According to another aspect of the technology described herein, a turbine apparatus includes: a turbine rotor stage including a disk rotatable about a centerline axis, the disk defining a rotor flowpath surface, and an array of axial-flow turbine blades extending outward from the rotor flowpath surface, the turbine blades defining spaces therebetween; a turbine nozzle stage comprising at least one wall defining a stator flowpath surface, and an array of axial-flow turbine vanes extending away from the stator flowpath surface, the turbine vanes defining spaces therebetween; and wherein at least one of the rotor or nozzle stages includes an array of splitter airfoils extending from at least one of the flowpath surfaces thereof, the splitter airfoils disposed in the spaces between the turbine blades or turbine vanes of the corresponding stage, wherein the splitter airfoils have a thickness ratio which is less than a thickness ratio of the corresponding turbine blades or turbine vanes.

BRIEF DESCRIPTION OF THE DRAWINGS

The invention may be best understood by reference to the following description taken in conjunction with the accompanying drawing figures in which:

FIG. 2 is a front elevation view of a portion of a turbine rotor suitable for inclusion in the engine of FIG. 1;

FIG. 3 is a top plan view of the rotor of FIG. 2;

FIG. 4 is a side view of a turbine blade shown in FIG. 2;

FIG. 5 is a side view of a splitter blade shown in FIG. 2;

DETAILED DESCRIPTION

Figure 1:
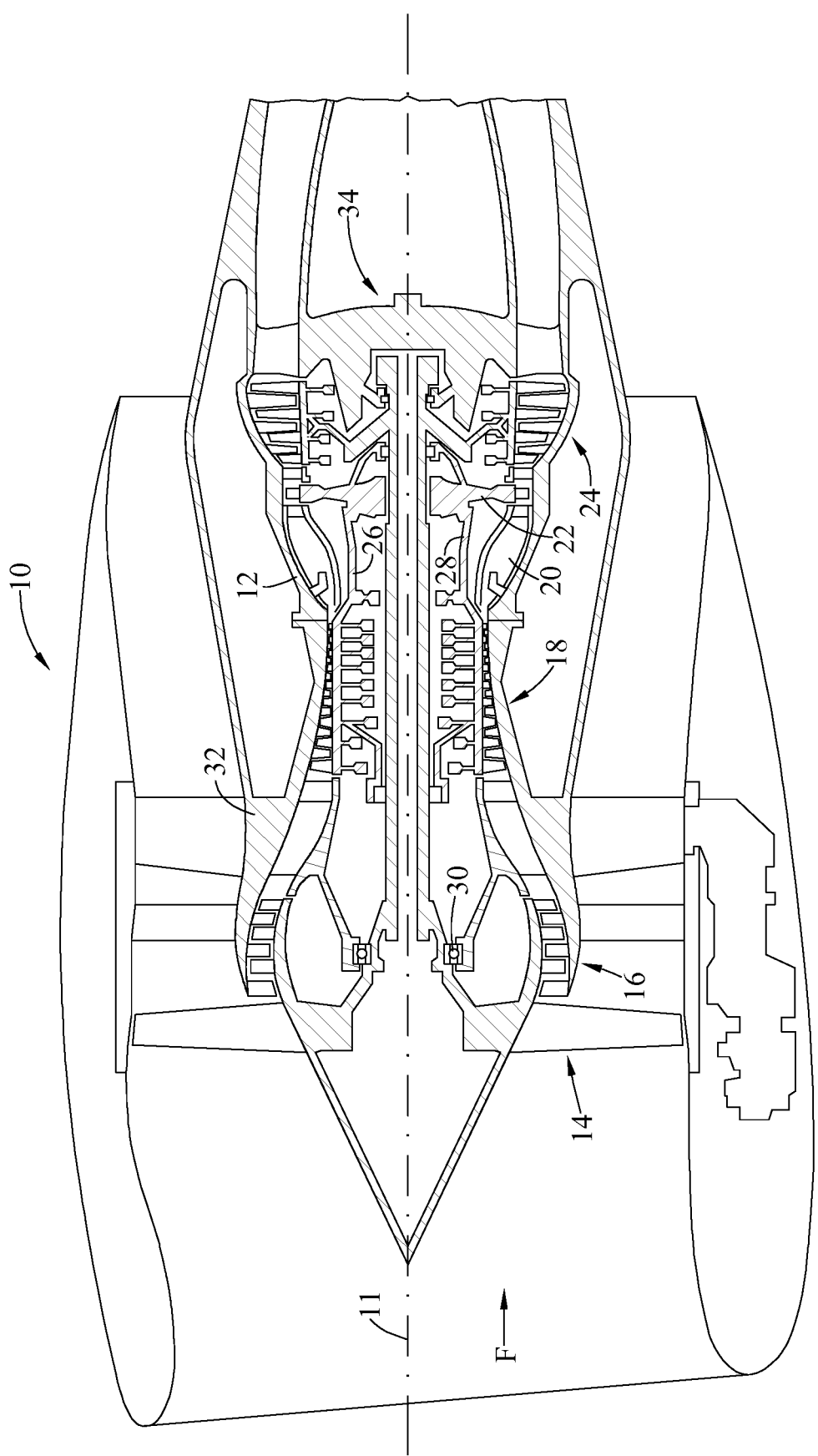
FIG. 1 is a cross-sectional, schematic view of a gas turbine engine that incorporates a turbine with splitters.
Figure 6:
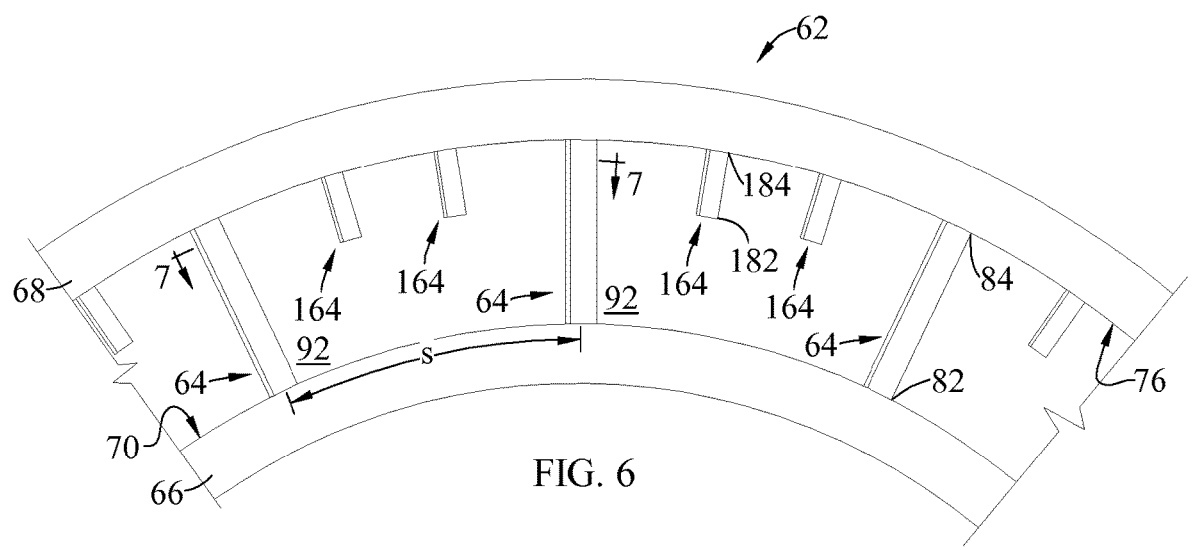
FIG. 6 is a front elevation view of a portion of a turbine nozzle assembly suitable for inclusion in the engine of FIG. 1.

Referring to the drawings wherein identical reference numerals denote the same elements throughout the various views, FIG. 1 depicts an exemplary gas turbine engine 10. While the illustrated example is a high-bypass turbofan engine, the principles of the present invention are also applicable to other types of engines, such as low-bypass turbofans, turbojets, turboprops, etc. The engine 10 has a longitudinal center line or axis 11 and a stationary core casing 12 disposed concentrically about and coaxially along the axis 11.

It is noted that, as used herein, the terms "axial" and "longitudinal" both refer to a direction parallel to the centerline axis 11, while "radial" refers to a direction perpendicular to the axial direction, and "tangential" or "circumferential" refers to a direction mutually perpendicular to the axial and tangential directions. As used herein, the terms "forward" or "front" refer to a location relatively upstream in an air flow passing through or around a component, and the terms "aft" or "rear" refer to a location relatively downstream in an air flow passing through or around a component. The direction of this flow is shown by the arrow "F" in FIG. 1. These directional terms are used merely for convenience in description and do not require a particular orientation of the structures described thereby.

The engine 10 has a fan 14, booster 16, compressor 18, combustor 20, high pressure turbine or "HPT" 22, and low pressure turbine or "LPT" 24 arranged in serial flow relationship. In operation, pressurized air from the compressor 18 is mixed with fuel in the combustor 20 and ignited, thereby generating combustion gases. Some work is extracted from these gases by the high pressure turbine 22 which drives the compressor 18 via an outer shaft 26. The combustion gases then flow into the low pressure turbine 24, which drives the fan 14 and booster 16 via an inner shaft 28. The inner and outer shafts 28 and 26 are rotatably mounted in bearings 30 which are themselves mounted in a fan frame 32 and a turbine rear frame 34.

FIGS. 2-5 illustrate a portion of an exemplary turbine rotor 36 suitable for inclusion in the HPT 22 or the LPT 24. While the concepts of the present invention will be described using the HPT 22 as an example, it will be understood that those concepts are applicable to any of the turbines in a gas turbine engine. As used herein, the term "turbine" refers to turbomachinery elements in which kinetic energy of a fluid flow is converted to rotary motion.

The rotor 36 includes a disk 38 including an annular flowpath surface 40 extending between a forward end 42 and an aft end 44. An array of turbine blades 46 extend from the flowpath surface 40. The turbine blades 46 constitute "turbine airfoils" for the purposes of this invention. Each turbine blade 46 extends from a root 48 at the flowpath surface 40 to a tip 50, and includes a concave pressure side 52 joined to a convex suction side 54 at a leading edge 56 and a trailing edge 58. The adjacent turbine blades 46 define spaces 60 therebetween.

The turbine blades 46 are uniformly spaced apart around the periphery of the flowpath surface 40. A mean circumferential spacing "s" (see FIG. 2) between adjacent turbine blades 46 is defined as $s=2\pi r/Z$, where "r" is a designated radius of the turbine blades 46 (for example at the root 48) and "Z" is the number of turbine blades 46. A nondimensional parameter called "solidity" is defined as c/s, where "c" is equal to the blade chord, described in detail below. In the illustrated example, the turbine blades 46 may have a spacing which is significantly greater than a spacing that would be expected in the prior art, resulting in a blade solidity significantly less than would be expected in the prior art.

As best seen in FIG. 4, each turbine blade 46 has a span (or span dimension) "S1" defined as the radial distance from the root 48 to the tip 50. Depending on the specific design of the turbine blade 46, its span S1 may be different at different axial locations.

For reference purposes a relevant measurement is the span S1 at the leading edge 56. Each turbine blade 46 has a chord (or chord dimension) "C1" (FIG. 3) defined as the length of an imaginary straight line connecting the leading edge 56 and the trailing edge 58. Depending on the specific design of the turbine blade 46, its chord C1 may be different at different locations along the span S1. For purposes of the present invention, the relevant measurement is the chord C1 at the root 48, i.e. adjacent the flowpath surface 40.

Each turbine blade 46 has a thickness "T1" defined as the distance between the pressure side 52 and the suction side 54 (see FIG. 3). A "thickness ratio" of the turbine blade 46 is defined as the maximum value of the thickness T1, divided by the chord length, expressed as a percentage.

An array of splitter blades 146 (FIG. 2) extend from the flowpath surface 40. The splitter blades constitute "splitter airfoils" for the purposes of this invention. One or more splitter blades 146 may be disposed in each of the spaces 60 between the turbine blades 46. In the circumferential direction, the splitter blade or blades 146 may be spaced uniformly or non-uniformly between two adjacent turbine blades 46. Each splitter blade 146 extends from a root 148 at the flowpath surface 40 to a tip 150, and includes a concave pressure side 152 joined to a convex suction side 154 at a leading edge 156 and a trailing edge 158. In the example shown in FIG. 2, the splitter blades 146 are positioned so that their trailing edges 158 are at approximately the same axial position as the trailing edges 58 of the turbine blades 46; however the axial position of the splitter blades 146 may be varied to suit a particular application.

As best seen in FIG. 5, each splitter blade 146 has a span (or span dimension) "S2" defined as the radial distance from the root 148 to the tip 150. Depending on the specific design of the splitter blade 146, its span S2 may be different at different axial locations. For reference purposes a relevant measurement is the span S2 at the leading edge 156. Each splitter blade 146 has a chord (or chord dimension) "C2" defined as the length of an imaginary straight line connecting the leading edge 156 and the trailing edge 158. Depending on the specific design of the splitter blade 146, its chord C2 may be different at different locations along the span S2.

For purposes of the present invention, the relevant measurement is the chord C2 at the root 148, i.e. adjacent the flowpath surface 40. Each splitter blade 146 has a thickness "T2" (FIG. 3) defined as the distance between the pressure side 152 and the suction side 154. A "thickness ratio" of the splitter blade 146 is defined as the maximum value of the thickness T2, divided by the chord length, expressed as a percentage.

The splitter blades 146 function to locally increase the hub solidity of the rotor 36 and thereby control undesired secondary flow around the turbine blades 46. A similar effect could be obtained by simply increasing the number of turbine blades 46, and therefore reducing the blade-to-blade spacing. This, however, has the undesirable side effect of increasing flow blockage and aerodynamic frictional losses which would manifest as reduced aerodynamic efficiency and increased rotor weight. Therefore, the dimensions of the splitter blades 146 and their position may be selected to control secondary flow while minimizing their surface area.

The thickness of the splitter blades 146 should be as small as possible consistent with structural, thermal, and aeroelastic considerations. Generally the splitter blades 146 should have a thickness ratio less than a thickness ratio of the turbine blades 46. As one example, the splitter blades 146 may have a thickness ratio of less than about 5%. As another example, the splitter blades 146 may have a thickness ratio of about 2%. For comparison purposes, this is substantially less than the thickness of the turbine blades 46. For example, the turbine blades 46 may be about 30% to 40% thick. Other turbine blades within the engine 10, such as in the LPT 24, may be about 5% to 10% thick.

The span S2 and/or the chord C2 of the splitter blades 146 may be equal to the corresponding span S1 and chord C1 of the turbine blades 46. Alternatively, the span S2 and/or the chord C2 of the splitter blades 146 may be some fraction less than unity of the corresponding span S1 and chord C1 of the turbine blades 46. These may be referred to as "part-span" and/or "part-chord" splitter blades. For example, the span S2 may be equal to or less than the span S1. Preferably for reducing frictional losses, the span S2 is 50% or less of the span S1. As another example, the chord C2 may be equal to or less than the chord C1. Preferably for the least frictional losses, the chord C2 is 50% or less of the chord C1.

The disk 38, turbine blades 46, and splitter blades 146 may be constructed from any material capable of withstanding the anticipated stresses and environmental conditions in operation. Non-limiting examples of known suitable alloys include nickel- and cobalt-based alloys.

The operational environment may exceed the temperature capability of metal alloys. Accordingly the turbine blades 46 may be actively cooled, in accordance with conventional practice, by providing them with a flow of coolant (such as compressor bleed air). The coolant is routed into internal passages of the turbine blades 46 and used for various forms of cooling such as conduction cooling, impingement cooling, and/or film cooling. As the turbine blades 46 generally have a significant thickness ratio, internal volume is available to incorporate active cooling features.

Because it is desirable to make the splitter blades 146 as thin as possible, there may not be internal volume available for active cooling features. Yet, metal alloys may not have sufficient high-temperature capability without active cooling.

This situation may be addressed by manufacturing all or part of the splitter blades 146 from nonmetallic high-temperature capable materials, such as ceramics, more particularly ceramic matrix composites ("CMC"). CMC is low density and tolerates high temperatures. Generally, commercially available CMC materials include a ceramic type fiber for example SiC, forms of which are coated with a compliant material such as Boron Nitride (BN). The fibers are carried in a ceramic-type matrix, one form of which is Silicon Carbide (SiC). CMC materials are often capable of operating in high-temperature gas environments without active cooling.

Optionally, all or part of the turbine blades 46 or disk 38 could be manufactured from the above-noted high-temperature materials.

In FIGS. 2-5, the disk 38, turbine blades 46, and splitter blades 146 are depicted as an assembly built up from separate components. The principles of the present invention are equally applicable to a rotor with airfoils configured as an integral, unitary, or monolithic whole. This type of structure may be referred to as a "bladed disk" or "blisk".

The splitter concepts described above may also be incorporated into turbine stator elements within the engine 10. For example, FIGS. 6-9 illustrate a portion of a turbine nozzle 62 suitable for inclusion in the HPT 22 or the LPT 24.

The turbine nozzle 62 includes a row of airflow-shaped turbine vanes 64 bounded at inboard and outboard ends, respectively by an inner band 66 and an outer band 68. The turbine vanes 64 constitute "stator airfoils" for the purposes of this invention.

The inner band 66 defines an annular inner flowpath surface 70 extending between forward and aft ends 72, 74. The outer band 68 defines an annular outer flowpath surface 76 extending between forward and aft ends 78, 80. Each turbine vane 46 extends from a root 82 at the inner flowpath surface 70 to a tip 84 at the outer flowpath surface 76, and includes a concave pressure side 86 joined to a convex suction side 88 at a leading edge 90 and a trailing edge 92. The adjacent turbine vanes 46 define spaces 92 therebetween.

The turbine vanes 64 are uniformly spaced apart around the periphery of the inner flowpath surface 70. The turbine vanes 64 have a mean circumferential spacing "s" and a solidity defined as described above (see FIG. 6). In the illustrated example, the turbine vanes 64 may have a spacing which is significantly greater than a spacing that would be expected in the prior art, resulting in a vane solidity significantly less than would be expected in the prior art.

Figures 7, 8, 9:
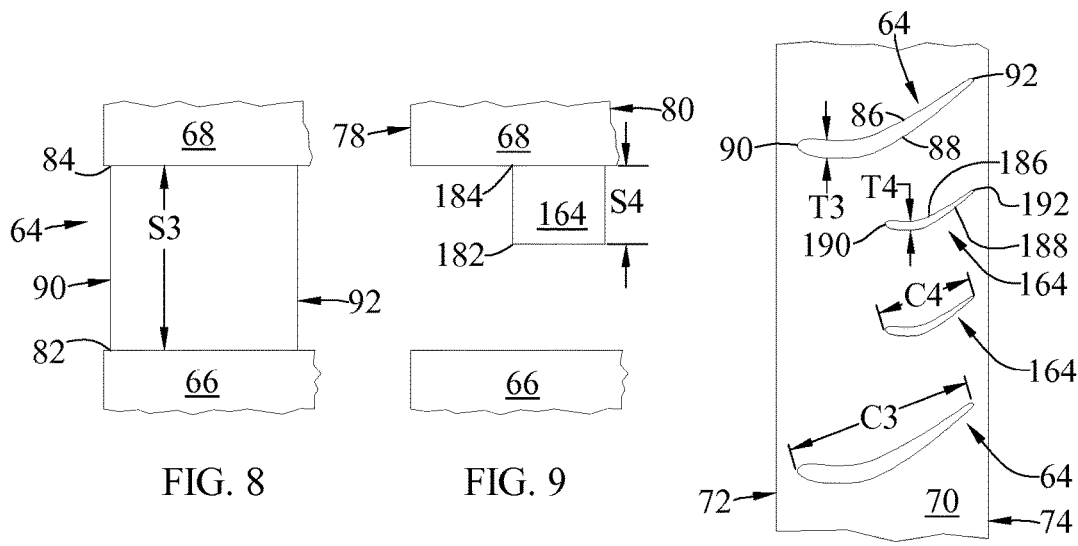
FIG. 7 is a view taken along lines 7-7 OF FIG. 6.
FIG. 8 is a side view of a stator vane shown in FIG. 6.
FIG. 9 is a side view of a splitter vane shown in FIG. 6.

As best seen in FIG. 8, each turbine vane 64 has a span (or span dimension) "S3" defined as the radial distance from the root 82 to the tip 84. Depending on the specific design of the turbine vane 64, its span S3 may be different at different axial locations. For reference purposes a relevant measurement is the span S3 at the leading edge 90. Each turbine vane 64 has a chord (or chord dimension) "C3" defined as the length of an imaginary straight line connecting the leading edge 90 and the trailing edge 92. Depending on the specific design of the turbine vane 64, its chord C3 may be different at different locations along the span S3. For purposes of the present invention, the relevant measurement would be the chord C3 at the root 82 or tip 84, i.e. adjacent flowpath surfaces 70 or 76.

Each turbine vane 64 has a thickness "T3" defined as the distance between the pressure side 86 and the suction side 88. A "thickness ratio" of the turbine vane 64 is defined as the maximum value of the thickness T3, divided by the chord length, expressed as a percentage.

One or both of the inner and outer flowpath surfaces 70, 76 may be provided with an array of splitter vanes. In the example shown in FIG. 6, an array of splitter vanes 164 extend radially inward from the outer flowpath surface 76. The splitter vanes constitute "splitter airfoils" for the purposes of this invention. One or more splitter vanes 164 are disposed between each pair of turbine vanes 64. In the circumferential direction, the splitter vane or vanes 164 may be spaced uniformly or non-uniformly between two adjacent turbine vanes 64. Each splitter vane 164 extends from a tip 184 at the outer flowpath surface 76 to a root 182, and includes a concave pressure side 186 joined to a convex suction side 188 at a leading edge 190 and a trailing edge 192. In the example shown in FIGS. 6 and 7, the splitter vanes 164 are positioned so that their trailing edges 192 are at approximately the same axial position as the trailing edges 92 of the stator vanes 64; however the axial position of the splitter vanes 164 may be varied to suit a particular application.

As best seen in FIG. 9, each splitter vane 164 has a span (or span dimension) "S4" defined as the radial distance from the root 182 to the tip 184, and a chord (or chord dimension) "C4" defined as the length of an imaginary straight line connecting the leading edge 190 and the trailing edge 192. Depending on the specific design of the splitter vane 164, its chord C4 may be different at different locations along the span S4. For purposes of the present invention, the relevant measurement is the chord C4 at the tip 184, i.e. adjacent flowpath surface 76. Each splitter vane 164 has a thickness "T4" defined as the distance between the pressure side 186 and the suction side 188. A "thickness ratio" of the splitter vane 164 is defined as the maximum value of the thickness T2, divided by the chord length, expressed as a percentage.

The splitter vanes 164 function to locally increase the solidity of the nozzle and thereby prevent the above-mentioned secondary flows. A similar effect could be obtained by simply increasing the number of turbine vanes 64, and therefore reducing the vane-to-vane spacing. This, however, has the undesirable side effect of increasing flow blockage and aerodynamic frictional losses which would manifest as reduced aerodynamic efficiency and increased nozzle weight. Therefore, the dimensions of the splitter vanes 164 and their position may be selected to prevent secondary flows while minimizing their surface area.

The thickness of the splitter vanes 164 should be as small as possible consistent with structural, thermal, and aeroelastic considerations. Generally the splitter vanes 164 should have a thickness ratio less than a thickness ratio of the turbine vane 64. As one example, the splitter vanes 164 may have a thickness ratio of less than about 5%. As another example, the splitter vanes 164 may have a thickness ratio on the order of about 2%.

The span S4 and/or the chord S4 of the splitter vanes 164 may be equal to the corresponding span S3 and chord C3 of the turbine vanes 64. Alternatively, the span S4 and/or the chord C4 of the splitter vanes 164 may be some fraction less than unity of the corresponding span S3 and chord C3 of the turbine vanes 64. These may be referred to as "part-span" and/or "part-chord" splitter vanes. For example, the span S4 may be equal to or less than the span S3. Preferably for reducing frictional losses, the span S4 is 50% or less of the span S3. As another example, the chord C4 may be equal to or less than the chord C3. Preferably for the least frictional losses, the chord C4 is 50% or less of the chord C3.

All or part of the splitter vanes 164 may comprise high-temperature capable materials such as the CMC materials discussed above.

Figure 10:
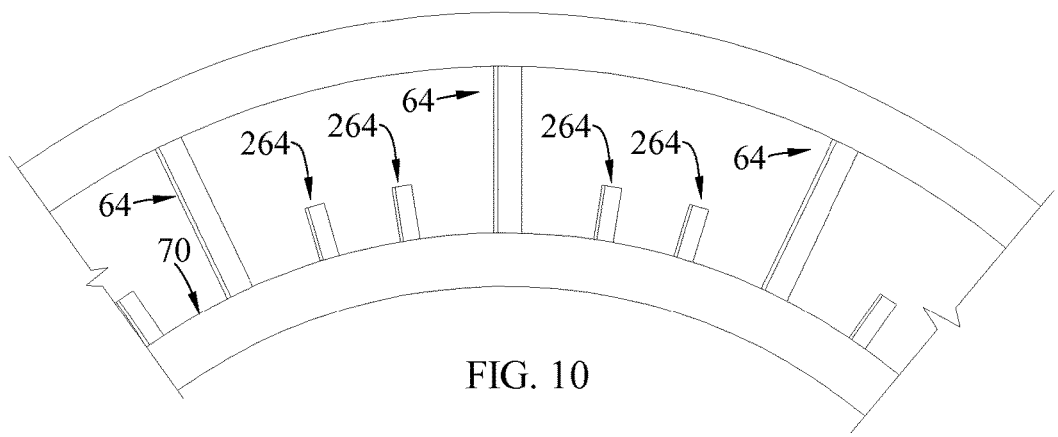
FIG. 10 is a front elevation view of a portion of an alternative turbine nozzle assembly suitable for inclusion in the engine of FIG. 1.

FIG. 10 illustrates an array of splitter vanes 264 extending radially outward from the inner flowpath surface 70. Other than the fact that they extend from the inner flowpath surface 70, the splitter vanes 264 may be identical to the splitter vanes 164 described above, in terms of their shape, circumferential position relative to the stator vanes 64, their thickness, span, and chord dimensions, and their material composition. As noted above, splitter vanes may optionally be incorporated at the inner flowpath surface 70, or the outer flowpath surface 76, or both.

The turbine apparatus described herein incorporating splitter blades and/or splitter vanes increases the endwall solidity level locally, to locally increase solidity in regions of high secondary flow without incurring the penalty from profile loss due to surface area in regions outside the region of interest.

The foregoing has described a turbine apparatus. All of the features disclosed in this specification (including any accompanying claims, abstract and drawings), and/or all of the steps of any method or process so disclosed, may be combined in any combination, except combinations where at least some of such features and/or steps are mutually exclusive.

Each feature disclosed in this specification (including any accompanying claims, abstract and drawings) may be replaced by alternative features serving the same, equivalent or similar purpose, unless expressly stated otherwise. Thus, unless expressly stated otherwise, each feature disclosed is one example only of a generic series of equivalent or similar features.

The invention is not restricted to the details of the foregoing embodiment(s). The invention extends to any novel one, or any novel combination, of the features disclosed in this specification (including any accompanying claims, abstract and drawings), or to any novel one, or any novel combination, of the steps of any method or process so disclosed.

The invention claimed is:

1. A turbomachinery apparatus, comprising:
a turbine, comprising:
a turbine component defining an arcuate flowpath surface;
an array of axial-flow turbine airfoils extending from the flowpath surface, the turbine airfoils defining spaces therebetween; and
a plurality of splitter airfoils extending from the flowpath surface in the spaces between the turbine airfoils,
wherein each of the plurality of splitter airfoils has opposed pressure and suction sides extending between a leading edge and a trailing edge,
wherein the splitter airfoils have a thickness ratio less than a thickness ratio of the turbine airfoils, and
wherein each of the plurality of splitter airfoils only extends partially in a radial direction between an outer band and an inner band of the turbine component so as to form a radial gap between a radial tip of each of the splitter airfoils and the inner band or the outer band.

2. The apparatus of claim 1, wherein each of the plurality of splitter airfoils is disposed on the outer band, and the radial gap is between the radial tip and the inner band.

3. The apparatus of claim 1, wherein each of the plurality of splitter airfoils is disposed on the inner band, and the radial gap is between the radial tip and the outer band.

4. A turbine apparatus, comprising:
a turbine rotor stage including a disk rotatable about a centerline axis, the disk defining a rotor flowpath surface, and an array of axial-flow turbine blades extending outward from the rotor flowpath surface, the turbine blades defining spaces therebetween;
a turbine nozzle stage comprising at least one wall defining a stator flowpath surface, and an array of axial-flow turbine vanes extending away from the stator flowpath surface, the turbine vanes defining spaces therebetween; and
wherein at least one of the rotor or nozzle stages includes an array of splitter airfoils extending from at least one of the flowpath surface thereof,
wherein the splitter airfoils are disposed in the spaces between the turbine blades or turbine vanes of the corresponding stage,
wherein the splitter airfoils have a thickness ratio which is less than a thickness ratio of the corresponding turbine blades—or turbine vanes, and
wherein each of the splitter airfoils only extends partially in a radial direction between an outer band and an inner band of the turbine rotor stage or the turbine nozzle stage so as to form a radial gap between a radial tip of each of the splitter airfoils and the inner band or the outer band.

5. The apparatus of claim 4, wherein each of the splitter airfoils is disposed on the outer band, and the radial gap is between the radial tip and the inner band.

6. The apparatus of claim 4, wherein each of the splitter airfoils is disposed on the inner band, and the radial gap is between the radial tip and the outer band.

* * * * *